United States Patent [19]

Derviller

[11] Patent Number: 5,716,042
[45] Date of Patent: Feb. 10, 1998

[54] SPRINGING MEANS FOR SUSPENSION SYSTEMS

[76] Inventor: Peter Reginald John Derviller, #35-185 Woodridge Drive S.W., Calgary, Alberta, Canada, T2W 3X7

[21] Appl. No.: 632,047

[22] Filed: Apr. 15, 1996

[51] Int. Cl.⁶ ..................................................... B60G 11/18
[52] U.S. Cl. ........................................ 267/274; 280/664
[58] Field of Search ................................ 267/273, 274, 267/277, 278, 285; 172/774, 233, 234; 206/806; 248/611, 637, 655; 280/660, 664, 663, 700, 788

[56] References Cited

U.S. PATENT DOCUMENTS

| | | |
|---|---|---|
| 2,148,029 | 2/1939 | Matthews .................... 267/274 |
| 2,191,221 | 2/1940 | Krotz ........................ 267/274 |
| 2,226,406 | 12/1940 | Krotz ........................ 267/274 |
| 2,401,209 | 5/1946 | Wilfert et al. . |
| 2,565,756 | 8/1951 | Coleman . |
| 2,606,758 | 8/1952 | Collier . |
| 2,858,142 | 10/1958 | Schjolin et al. . |
| 2,919,126 | 12/1959 | Loehr . |
| 2,925,264 | 2/1960 | Loehr . |
| 2,972,489 | 2/1961 | Collier et al. . |
| 2,983,505 | 5/1961 | Hanslip . |
| 2,988,371 | 6/1961 | Allison . |
| 2,998,241 | 8/1961 | Eyb . |
| 3,096,085 | 7/1963 | Owens . |
| 3,131,576 | 5/1964 | Schilberg . |
| 3,137,513 | 6/1964 | Marot ....................... 267/274 |
| 3,178,200 | 4/1965 | Backaitis et al. . |
| 3,815,685 | 6/1974 | Seifert, Jr. . |
| 3,831,966 | 8/1974 | Grosseau . |
| 3,858,901 | 1/1975 | Johnson . |
| 4,278,270 | 7/1981 | Fry . |
| 4,635,958 | 1/1987 | Yonemoto . |
| 4,781,364 | 11/1988 | Finn et al. . |
| 4,798,396 | 1/1989 | Minakawa . |
| 4,881,752 | 11/1989 | Tanaka . |
| 5,022,673 | 6/1991 | Sekino et al. . |
| 5,074,582 | 12/1991 | Parsons . |
| 5,102,159 | 4/1992 | Sato et al. . |
| 5,161,818 | 11/1992 | Kopieczek . |

FOREIGN PATENT DOCUMENTS

| | | |
|---|---|---|
| 1257617 | 7/1989 | Canada . |
| 1271202 | 7/1990 | Canada . |
| 1317320 | 5/1993 | Canada . |
| 2090881 | 9/1993 | Canada . |
| 59-94910 | 5/1984 | Japan . |
| 59-125403 | 7/1984 | Japan . |
| 133383 | 3/1947 | Sweden . |

OTHER PUBLICATIONS

Manual on Design and Manufacture of Torsion Bar Springs, SAE HS-796, SAE International, The Engineering Society for Advancing Mobility Land Sea Air and Space, last revised Jul. 1990, pp. 3 to 6.

*Primary Examiner*—Lee W. Young
*Assistant Examiner*—C. T. Bartz
*Attorney, Agent, or Firm*—Ridout & Maybee

[57] ABSTRACT

A torsion bar springing means for a suspension system, in which angular motions of first and second control members of the suspension linkage are respectively coupled to separate points of securement on the torsion bar, giving rise to a differential torsional spring resistance to displacements in the vehicle suspension system. This double-acting arrangement differs from conventional single-acting torsion bar springing mechanisms in which a spring device is interposed between an attachment point on the suspension linkage and an attachment point on the chassis of the vehicle. Advantages of simplicity, flexibility of adjustment and economy result from a Differential Torsion Spring mechanism according to the invention, which resists deflection of the suspension from within its geometric linkage.

14 Claims, 7 Drawing Sheets

SPRINGING MEANS FOR SUSPENSION SYSTEMS

BACKGROUND OF THE INVENTION

1. Field of the Invention

The present invention relates to novel springing means for conferring elastic properties on a mechanical linkage between a sprung and an unsprung mass. More particularly, springing means of this kind are adapted for application in vehicle suspension systems.

2. Description of the Related Art

Except as specifically defined herein, terms and symbols used in the specification conform to those defined in the Society of Automotive Engineers Reports of the Spring Committee (4th ed. 1991), entitled "Manual on Design and Manufacture of Torsion Bar Springs" (SAE HS-796), and of the Vehicle Dynamics Committee—July 1952 (July 1976 revision), entitled "Vehicle Dynamics Terminology" (SAE J670e).

In this specification "vehicle" refers to a wheeled conveyance such as an automobile, all-terrain vehicle (ATV), truck, bus, or trailer operating on a running surface such as a road, or over rough terrain.

By "suspension system" is meant the entire assembly of control arm linkages, spring devices, anti-roll bars ("sway bars") and dampers ("shock absorbers"). All vertical forces and loads experienced by the vehicle are assumed to be reacted at the centres of the tire treads where they make contact with the running surface (i.e. "contact patches").

The operational characteristics of a suspension system are determined by the geometry of the mechanism for transferring motion between the sprung and unsprung mass through the use of combinations of control arms, links, sliding telescopic struts, pivots and rotating members, and by the resistance to deflection of the springs and dampers (shock absorbers) incorporated therein. The elastic spring devices used in vehicle suspension systems are usually steel but may be of rubber, gas or advanced composite material. The steel or composite spring may be configured as a "leaf" design to bend as it resists deflection, or as a torsion bar, either straight or coiled, designed to twist as it resists deflection.

The extent to which a spring deflects under load is referred to as its "spring rate" and is expressed in terms of force for unit deflection, i.e. Newton/millimeters (N/mm) or pounds per inch. The more resistant the spring, the higher or "stiffer" the spring rate is said to be.

The vertical deflection of the road wheel which results when the vehicle suspension system is subjected to static and dynamic loads is referred to as "compliance". Resistance to deflection compliance under steady state conditions is primarily generated by the springing means, while the shock absorbers provide additional resistance (i.e damping) to the vibrations that are excited by transient forces. The actual resistance to vertical deflection that the springing means exerts at the wheel is governed by the spring rate of the spring device itself, modified by the geometric relationship between the attachment points of the spring and the contact patch of the wheel.

The suspension system's overall resistance to vertical compliance measured at the contact patch—termed the "wheel rate"—is expressed in terms of the unit force required to produce unit vertical deflection in N/mm or pounds per inch. Very compliant systems are referred to as "soft", while those which are highly resistant to vertical deflection are denoted "hard" or "stiff".

A suspension system incorporates a mechanical linkage interposed between two mass assemblies whose relative motion is affected by the springs and dampers that are attached to the linkage. In a vehicle suspension system, the mass assembly, including the passenger and cargo compartment, referred to as the "sprung mass" of the vehicle, is typically suspended by means of spring devices interposed between attachment points on the chassis of the vehicle and attachment points on the linkages which support the upright, hub carrier, wheel, brake, and axle assemblies, referred to as the "unsprung mass".

In what follows, Applicant uses the term "single-acting" to refer to the conventional arrangement, in which one end of the spring in a vehicle suspension system is anchored to the chassis (i.e. to the sprung mass) and the other end to a control arm, which itself is pivotally connected to the upright, hub carrier, wheel etc. (i.e. the unsprung mass). As discussed below, the novelty and utility of springing means according to the present invention relates to its "double-acting" character. Applicant has coined the term "Differential Torsion Spring" to suggest the new device's operative attachment only to control arms of a suspension and its actuation by differential motion of those control arms.

Historically, the most widely used springing means for automobile suspension systems have been the leaf spring and coil spring (a coil spring is a coiled torsion bar). The straight torsion bar has been used extensively in vehicle wheel suspension systems. Reference may be made, for example, to U.S. Pat. Nos. 2,972,489 (Collier et al.); 3,178,200 (Backaitis et al.); and 3,831,966 (Grosseau). However, the straight torsion bar, used as a conventional single-acting springing means, is inherently of greater length and weight, requiring more space for installation in a given application, than is a coil spring.

The basic requirement of any springing means for a suspension system, including torsion bars, is that without exceeding its elastic limit, it must accommodate the maximum deflection required by the operational range of motion of a vehicle's suspension system, while at the same time maintaining a sufficiently high spring rate to react the expected static and dynamic loads at the wheel's contact patch. This dual requirement for simultaneously accommodating (i) the amplitude of deflection, and (ii) the forces generated within the system, typically leads to a torsion bar whose requisite length and weight often run counter to the overall design constraints for the vehicle. It is for this reason that the straight torsion bar has much more frequently been put to use in larger vehicles, such as four-wheel-drive, off-road, and military vehicles.

One solution to the size problem of single-acting torsion bars was suggested in U.S. Pat. No. 2,858,142 (Schjolin et al.), relating to a truck or bus having a single-acting torsion bar suspension requiring sufficient spring stiffness to accommodate a heavy vehicle, and hence a relatively long and heavy torsion bar. If a bar of the requisite characteristics were a one-piece unit, it would extend far ahead of or behind the axle. The Schjolin arrangement is a relatively complex combination of connections designed to effectively "fold" the torsion bar on itself and, by gearing the two halves together, to permit the bar to fit within an acceptable physical envelope.

U.S. Pat. No. 4,635,958 (Yonemoto) seeks to address the complexity and difficult adjustability of known single-acting torsion bar springs by means of an improvement to a bracket capturing the end of a torsion bar installed as an extension of the pivot axis of the vehicle's front upper control arm.

This arrangement, however, requires considerable space for mounting under the floor, extending from the front suspension to a point approximately level with the front seats of the vehicle.

All of the vehicle suspension systems exemplified in the prior art are "single-acting" as defined above, so that angular motion of the vehicle suspension system is imparted directly to the torsion bar. This requires the use of a lengthy torsion bar to satisfy the stiffness and angular deflection requirements.

The novel Differential Torsion Spring of the present invention is double-acting, in that its torsion bar spring element is coupled to two separate control members of the suspension system, from the angular motions of which there is derived a differential motion which drives the Differential Torsion Spring. In its application in a vehicle suspension system, the Differential Torsion Spring of the present invention thus has no direct connection to the vehicle chassis, but reacts to the static and dynamic loads experienced by the suspension system by resisting deflection of the suspension from within the geometric linkage of the suspension.

This novel double-acting arrangement effectively decouples the factor of angular displacement of the suspension system from the factor of torsional stiffness, thereby making possible a simple and inexpensive suspension springing means, incorporating a wide range of adjustability and variability of spring rate, without the weight and size disadvantages of conventional (single-acting) torsion bar arrangements.

The Differential Torsion Spring represents a particular improvement on prior torsion bar designs in those applications requiring light and compact mechanical construction, and precise control and location of the road wheel as, for example, in the design of front-wheel drive automobiles. The Differential Torsion Spring is also suitable for applications requiring large suspension deflections, particularly where high wheel rates are additionally required. Further, the arrangement of the present invention, by acting within the suspension linkage and having no direct connection to the chassis, permits isolation of the sprung mass from vibrations in the unsprung mass by means of conventional rubber bushings in the control arm pivots.

Although vehicle suspension systems are the primary contemplated application of the Differential Torsion Spring of the present invention, it is suited to other applications requiring high spring rates and large deflections, for example as a "trip-spring" to connect the unsprung mass of an implement arm (e.g. a plough blade) to the sprung mass of a vehicle-carried mounting structure for the implement arm. An example of the conventional application of torsion springs to this application is Siren in U.S. Pat. No. 3,815,685 (Seifert, Jr.).

SUMMARY OF THE INVENTION

According to the present invention, novel springing means for the mechanical linkage between a sprung mass assembly and an unsprung mass assembly in a suspension system comprises (i) a torsion bar coaxial with the pivot axis of a first control member of the suspension system, the torsion bar being torsionally secured near at least one end thereof to the first control member for co-rotation of said at least one end of the bar with the first control member about the pivot axis; (ii) a lever torsionally secured at an inner end thereof to the torsion bar at a selected intermediate position between the ends of the torsion bar and extending radially outwardly from that position to an outer end of the lever; and (iii) means for pivotally linking the lever to the second control member.

By this arrangement, a differential resultant of the angular motions of the first and second control members produces a reactive torsional spring resistance in the torsion bar between its points of torsional securement to the first control arm and to the lever, in reaction to relative displacement of the sprung and unsprung mass assemblies.

The Differential Torsion Spring may be incorporated in a wide variety of suspension linkages, particularly those requiring high spring rates, as in the trailing-arm or radius-arm suspensions typical in trailers.

According to one embodiment of the present invention, novel springing means for the mechanical linkage between a sprung mass assembly and an unsprung mass assembly in a suspension system comprises (i) a torsion bar coaxial with the pivot axis of a first control member of the suspension system, the torsion bar being torsionally secured at both ends thereof to inboard branches of the first control member for co-rotation of both ends of the torsion bar with said first control member about its pivot axis; (ii) a lever torsionally secured at the inner end thereof to the torsion bar at a position equidistant from the two points of torsional securement to the first control member and extending radially outwardly from said position to an outer end of the lever; and (iii) means for pivotally linking the lever to the second control member.

According to a preferred embodiment of the present invention, novel springing means for the mechanical linkage between a sprung mass assembly and an unsprung mass assembly in a suspension system comprises (i) a torsion bar coaxial with the pivot axis of the first control member of the suspension system, the torsion bar being torsionally secured near one end thereof to the first control member for co-rotation of that end of the bar with the first control member about the pivot axis, the other end of the torsion bar being free of torsional engagement with the first control member, (ii) a lever torsionally secured at an inner end thereof to the torsion bar at a position near the free end of the torsion bar and extending radially outwardly from that position to an outer end of the lever; and (iii) means for pivotally linking the lever to the second control member.

According to a further preferred embodiment of the invention there is provided a springing means for an SLA (Short-Long-Arm) or double wishbone type vehicle suspension system, comprising a torsion bar coaxial with the pivot axis of one of the upper and lower control arms of the suspension and torsionally secured near one end thereof to that control arm for co-rotation therewith, the other end of the torsion bar being free of torsional engagement with that control arm; (ii) a lever torsionally secured at an inner end thereof to the torsion bar at a position near the free end of the torsion bar and extending radially outwardly therefrom to an outer end of the lever; and (iii) an adjustable-length tie-rod pivotally connected at a first end thereof to a selected attachment on the lever and pivotally connected at a second end thereof to a selected position of attachment on the other one of the upper and lower control arms of the linkage, so that a differential resultant of the angular motions of the first and second control arms produces in the torsion bar a reactive torsional spring resistance to relative displacements of the sprung and unsprung mass assemblies.

BRIEF DESCRIPTION OF THE DRAWINGS

Various embodiments are now described, by way of example only, with reference to the accompanying drawings, in which.

5,716,042

DESCRIPTION OF EMBODIMENTS

SLA or Double Wishbone Suspension

Figure 1:
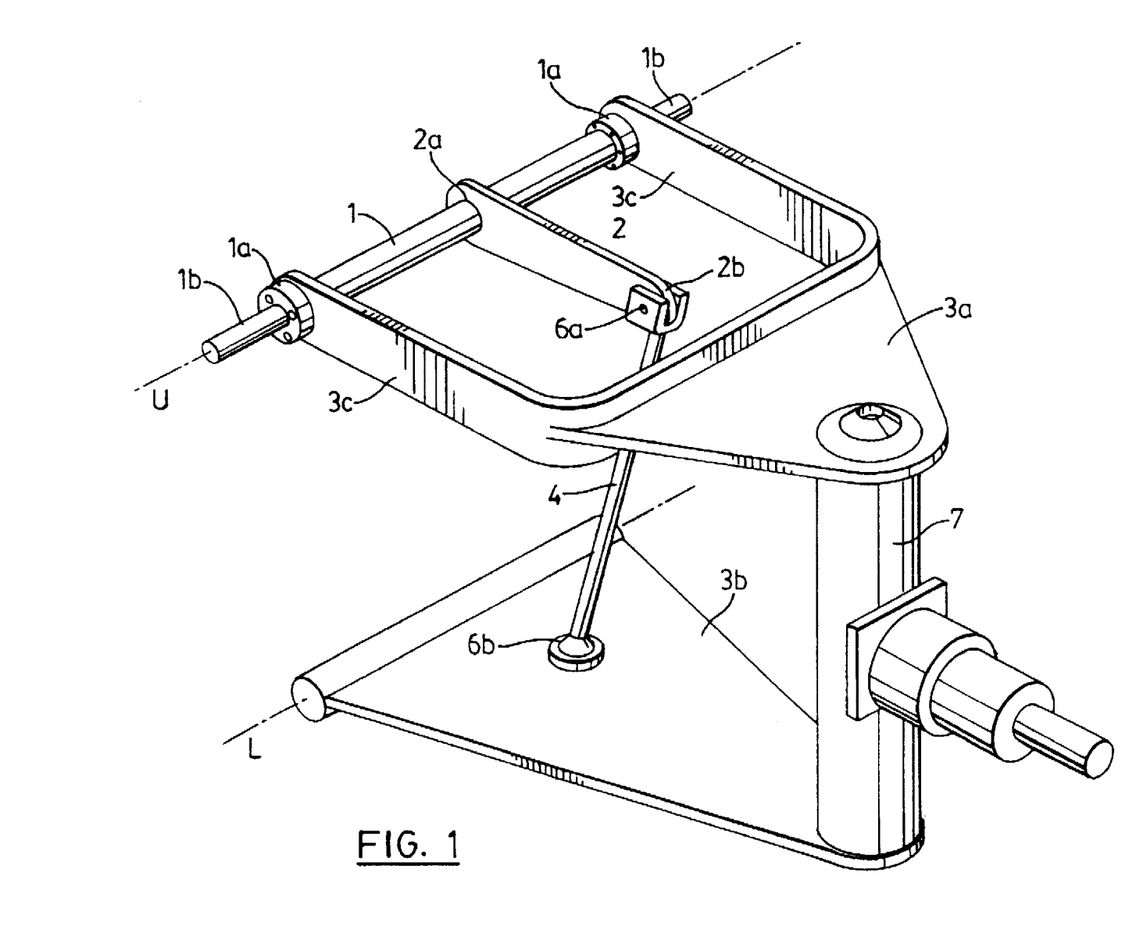
FIG. 1 illustrates schematically a first embodiment of the Differential Torsion Spring in accordance with the present invention operatively connected to the control arms of a double vehicle wishbone-type suspension.
Figure 2:
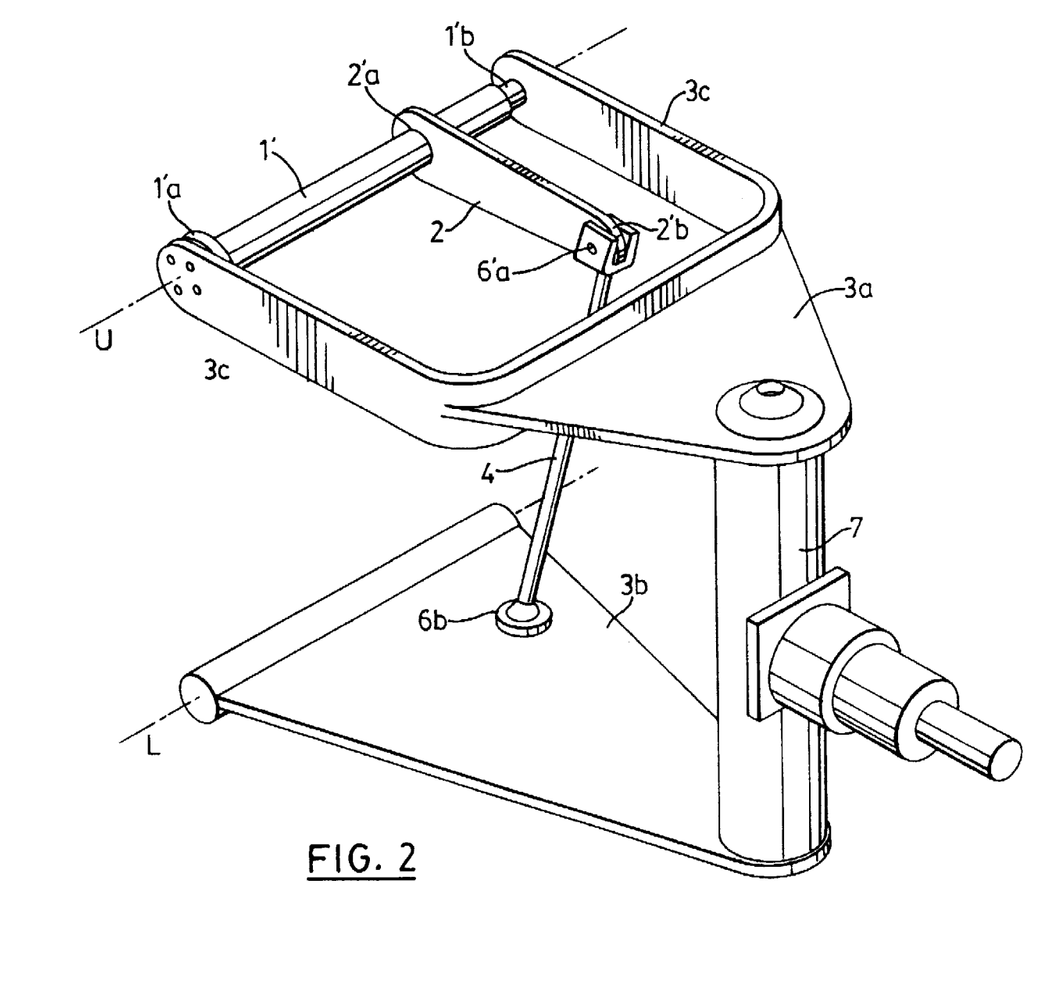
FIG. 2 schematically illustrates a second, preferred embodiment of the Differential Torsion Spring in accordance with the present invention, operatively connected to the control arms of a double wishbone-type vehicle suspension.

A Differential Torsion Spring according to the invention is particularly adapted for use in an SLA or double wishbone-type automotive suspension. Schematically illustrated in FIGS. 1 and 2 are embodiments of the Differential Torsion Spring of the invention in connection in use to the upper and lower control arms of a double wishbone suspension linkage. The upper and lower control arms and associated elements of the double wishbone suspension linkage are identified by the same reference numerals in FIGS. 1 and 2.

FIG. 1 schematically illustrates a first, "elementary" embodiment of the Differential Torsion Spring, comprising a torsion bar 1, a lever 2 torsionally secured at the central position of the torsion bar at its inner end 2a and pivotally connected at its outer end 2b to an adjustable-length tie-rod 4 by means of pivoting connection 6a.

Schematically illustrated in FIG. 2 is a second, preferred embodiment of the Differential Torsion Spring, comprising torsion bar 1', lever 2' torsionally secured to one end of the torsion bar 1' at the inner end 2'a thereof and pivotally connected at its outer end 2'b to adjustable-length tie-rod 4' by pivoting connection 6'a.

In both FIG. 1 and FIG. 2 are shown elements of the independent wheel suspension of the double wishbone variety in which upright member 7 is coupled transversely to the vehicle body by way of upper and lower control arms 3a and 3b, respectively. These control arms are mounted to the vehicle chassis by means of convention metal/metal bearings or rubber/metal/rubber ("RB") bushings for pivotal motion about axes U and L, respectively. The double wishbone linkages arranged substantially in the manner of a quadrilateral link mechanism, with one link formed by the upright 7, the opposite link by the vehicle's structure and the lateral upper and lower links by the upper and lower control arms 3a and 3b.

In the elementary embodiment of Differential Torsion Spring illustrated in FIG. 1, the torsion bar 1 may be integrated into the pivotal axis of either the upper or lower control arm, but in the arrangement shown is integrated with the pivotal axis U of upper control arm 3a. Flanges 1a may be machined onto the ends of the torsion bar 1 to serve as attachment means for fixedly attaching the ends of the torsion bar 1 to both bifurcation branches 3c of the upper control arm 3a. Spindles 1b may be machined onto the ends of the torsion bar 1 for free rotation in bushings or bearings in branches 3c of the upper control arm 3a, so that the spindles 1b co-rotate with control arm 3a about axis U.

In the elementary embodiment of FIG. 1, equidistant between the flanges 1a, lever 2 is torsionally secured without slippage by means of a drive engagement profile, such as a spline or square drive, enabling the lever 2 to capture the torsion bar 1.

In the preferred arrangement of FIG. 2, the torsion bar 1' may again be integrated into the pivotal axis of either control arm, being shown in FIG. 2 as integrated with the pivotal axis U of upper control arm 3a. A single flange 1'a may be machined onto one end of the torsion bar to serve as attachment means for fixedly attaching that end of the torsion bar to the associated branch 3c of upper control arm 3a. A spindle 1'b may be machined onto the opposite end of the torsion bar 1', for free rotation in bushings or bearings in the other branch 3c of upper control arm 3a, so that the spindle is free to move independently of the rotation of control arm 3a. Adjacent the free end of the torsion bar 1', lever 2' is torsionally secured without slippage by drive engagement profile enabling the lever 2' to capture the torsion bar 1'.

The fundamental principle of operation of the Differential Torsion Spring is the same in the embodiment of FIG. 2 as in FIG. 1, corresponding essential components of the DTS being given the same, but primed, reference numerals in FIG. 2 as in FIG. 1.

With reference to the elementary embodiment of FIG. 1, the length in diameter of torsion bar 1, the length of lever 2 and the location on control arm 3b of the pointed attachment of tie-rod 4' are selected, such that when the suspension linkage deflects in use the differential rotation between the torsion bar 1 torsionally fixed to upper control arm 3a and torsionally coupled to the lower control arm 3b (via the pivoting linkage of lever 2 and tie-rod 4) generates a torsional reaction in the bar which resists a deflection of the suspension linkage.

Similarly, with reference to the embodiment of FIG. 2, the length and diameter of torsion bar 1', the length of lever 2' and the location on control arm 3b are selected so that a torsional reaction is generated in torsion bar by the differential rotation between that end of torsion bar 1' torsionally fixed to upper control arm 3a and the other end of other end of torsion bar 1' which is torsionally coupled by the pivoting linkage of lever 2' in tie-rod 4' to a lower control arm 3b.

Figure 3:
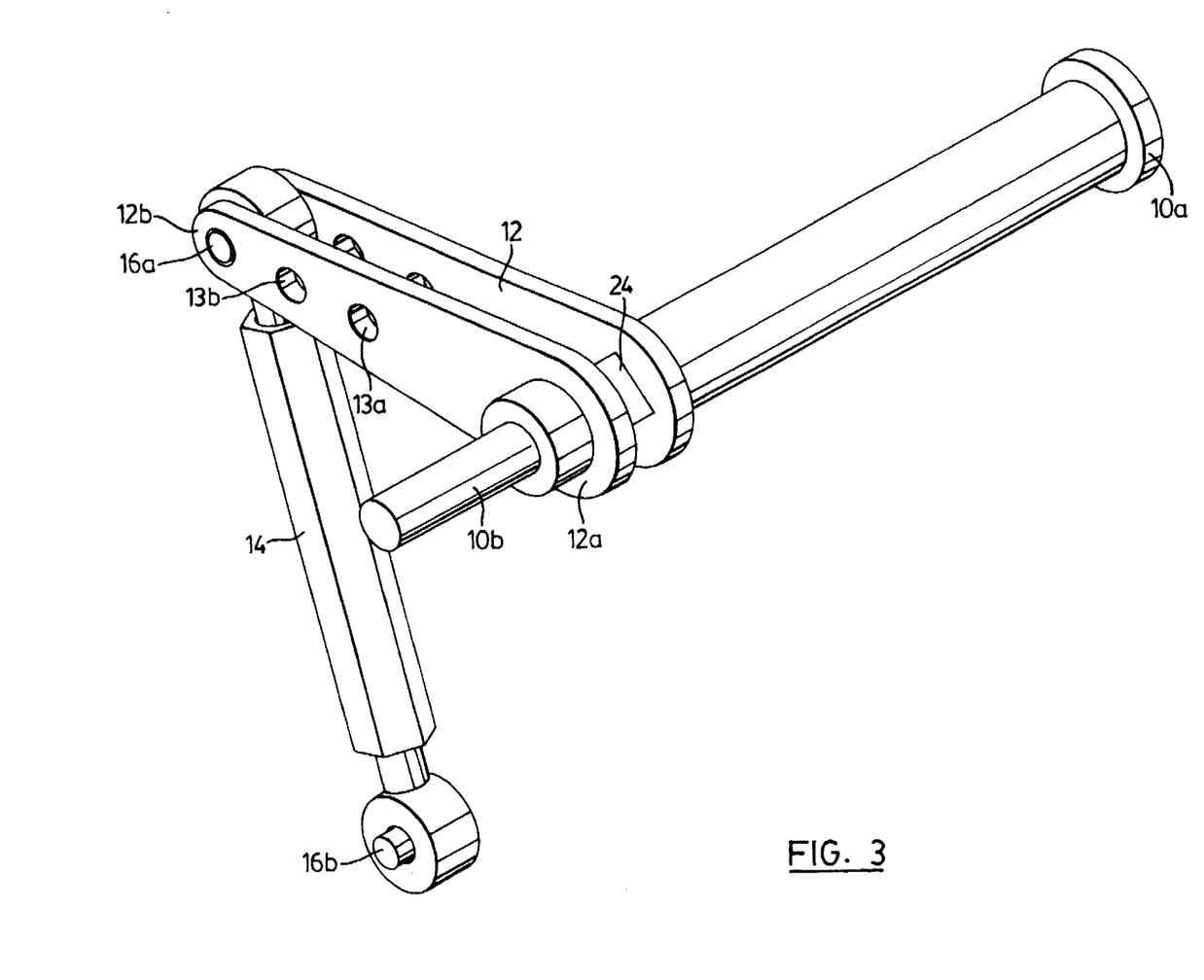
FIG. 3 illustrates the basic components of a Differential Torsion Spring according to the preferred embodiment.
Figure 4:
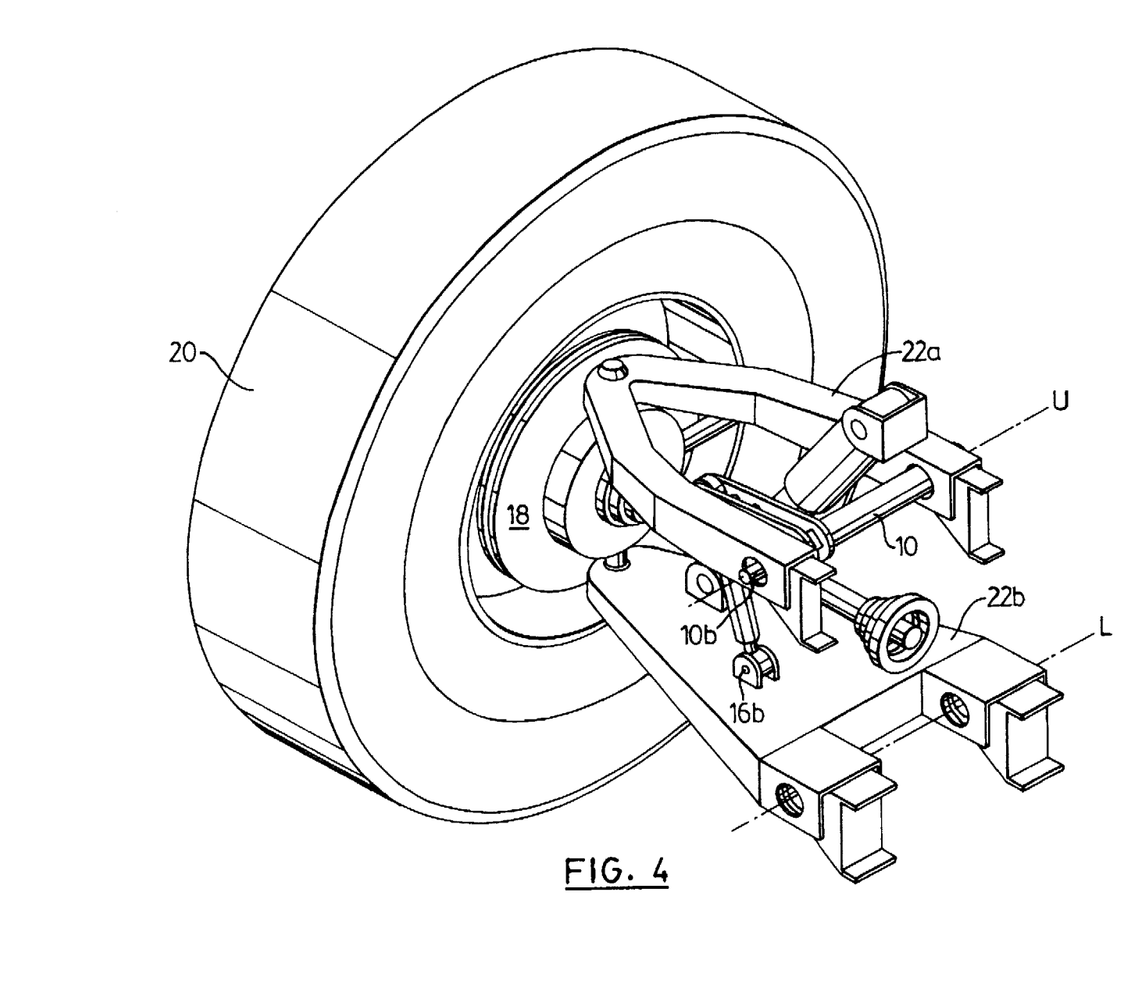
FIG. 4 illustrates the installation of the Differential Torsion Spring of FIG. 3 in a typical double wishbone vehicle suspension linkage showing the typical relative positions of chassis and suspension elements.

FIGS. 3 and 4 illustrate, respectively, the basic components of a differential spring according to the preferred embodiment of DTS and its installation in a typical double wishbone vehicle suspension linkage.

The preferred embodiment of Differential Torsion Spring shown in FIG. 3 is a specific example of the preferred arrangement of torsion spring, lever and adjustable tie-rod discussed above in connection with FIG. 2. As illustrated in FIG. 3, the preferred embodiment of Differential Torsion Spring comprises a torsion bar 10, a lever 12 torsionally secured to one end of the torsion bar at its inner end 12a and pivotally connected at its outer end 12b to an adjustable-length tie-rod 14 by pivoting connection 16a.

The independent wheel suspension system partly shown in FIG. 4 is of the aforementioned double wishbone variety.

A hub carrier 18 rotatably supporting a wheel 20 is coupled transversely to the vehicle body by way of a pair of upper and lower control arms 22a and 22b mounted to the vehicle chassis by means of metal/metal bearings or conventional RB bushings for pivotal motion about axes U and L, respectively.

Torsion bar 10 in the arrangement shown in FIGS. 3 and 4 is integrated into pivotal axis U of upper control arm 22a. A flange 10a is machined onto one end of the torsion bar to serve as attachment means for fixedly attaching that end of the torsion bar 10 to the associated branch of upper control arm 22a. A spindle 10b may be machined onto the opposite end of the torsion bar, for free rotation in bushings or bearings in the other branch of upper control arm 22a, so that the spindle 10b is free to move independently of the rotation of control arm 22a.

Adjacent the free end of the torsion bar, lever 12 is torsionally secured without slippage by a drive engagement profile enabling the lever to capture the torsion bar. In the embodiment illustrated, the torsion bar has been machined over a short section of its length to a square cross-sectional profile 24 which engages with the walls of like-shaped apertures in lever 12.

Lower control arm 22b, typically being a pressed steel member with an inverted "U" cross-section, affords a convenient surface for pivotal attachment 16b of tie-rod 14 to the lower control arm 22b. Adjustable tie-rod 14 thus links attachment point 16a at the outboard extremity of lever 12 to attachment point 16b on the lower control arm.

Again, the length and diameter of torsion bar 10, the length of lever 12 and the location on control arm 22b of the point of attachment of tie-rod 14 are so selected, that when the suspension linkage deflects in use the differential rotation between the end of the torsion bar torsionally fixed to upper control arm 22a and the end of the torsion bar torsionally coupled (by the pivoting linkage of lever 12 and tie-rod 14) to the lower control arm 22b, generates a torsional reaction in the bar which resists deflection of the suspension linkage.

In the installation of a Differential Torsion Spring according to the present invention in the double wishbone suspension or, indeed, any other type of suspension in a given vehicle, the geometry of the suspension control arms and links is established by design methodology that is well known to those skilled in the art. In both known single-acting torsion bar suspensions and with a suspension making use of the Differential Torsion Spring of the present invention, the wheel rate at the contact patch and the rising or falling profile of the spring's load-deflection characteristics throughout the suspension's operational range, are dictated in part by design of the particular geometry of the suspension linkage in which the torsion bar functions as the pivotal axis of one of the control arms, as well as the torsion bar's material composition, diameter, length, lever length, lever angle at static load, and windup angle.

All prior designs of torsion bar double wishbone suspension systems include provisions for adjusting the pre-load and vehicle ride-height. With the use of a Differential Torsion Spring as in FIGS. 1 to 4, a wide range of adjustability of the wheel rate as well as the profile of load-deflection characteristics is achievable by simple adjustments to the positioning of the upper and lower pick-up points of the tie-rod and the starting angle of the lever at the DTS.

In the embodiment of FIGS. 3 and 4, variations of the upper pick-up point can be made by providing lever 12 with a linear sequence 13a, 13b etc. of attachment locations for the upper pivoting connection 16a of tie-rod 14. The tie-rod may be made adjustable in length by any of a number of conventional means, such as providing the tie-rod with female tapped ends to receive left and right-hand threaded Hiem joints (spherical bearings in housings with threaded shanks). The tie-rod is then simply twisted about its axis to adjust its overall length. The Hiem joints are then locked in place by jamb-nuts.

The initial setting of the suspension linkage which determines the static ride height of the vehicle is coarsely adjusted by pre-setting at zero load, the attachment points of tie-rod 14 and the angular position of lever 12 relative to the control arm 22a to which the torsion bar is fixed, and finely adjusted by extension or contraction of the adjustable tie-rod.

The calculations which must be carried out to optimize the torsion bar characteristics and the geometric dimensions of the components of the Differential Torsion Spring in this application are specific to the given suspension system of the model of vehicle. They are, however, entirely conventional and within the ordinary skill of designers and installers of suspension systems.

To estimate the size of the torsion bar required, it is first necessary to know the wheel rate that is called for in the vehicle in question, defined as the vertical downward force required at the contact patch per unit upward vertical deflection. Say, for the purpose of this simplified example, that the designer establishes the wheel rate at 300 lbs per inch and specifies 3 inches of vertical travel at maximum jounce. If the corner weight of the example vehicle is 600 pounds, at maximum jounce the total of the static and dynamic forces reacted will be (600+(3×300)) lbs=1500 lbs. The next steps are to lay out the Differential Torsion Spring's dimensions, and the geometry of its linkage relative to the suspension control arms, in a configuration that will yield an acceptable range of motion to accommodate these forces and give the suspension the required operational attributes such as wheel rate and force-deflection characteristics, within acceptable limits of stress in the torsion bar and other components. Actual recent experience has shown that the Differential Torsion Spring can accommodate the same forces, at an equal stress level, as a modern mass-produced conventional single-acting torsion bar of approximately twice its weight and more than three times its length.

Double Trailing-Arm Suspension

Figure 5:
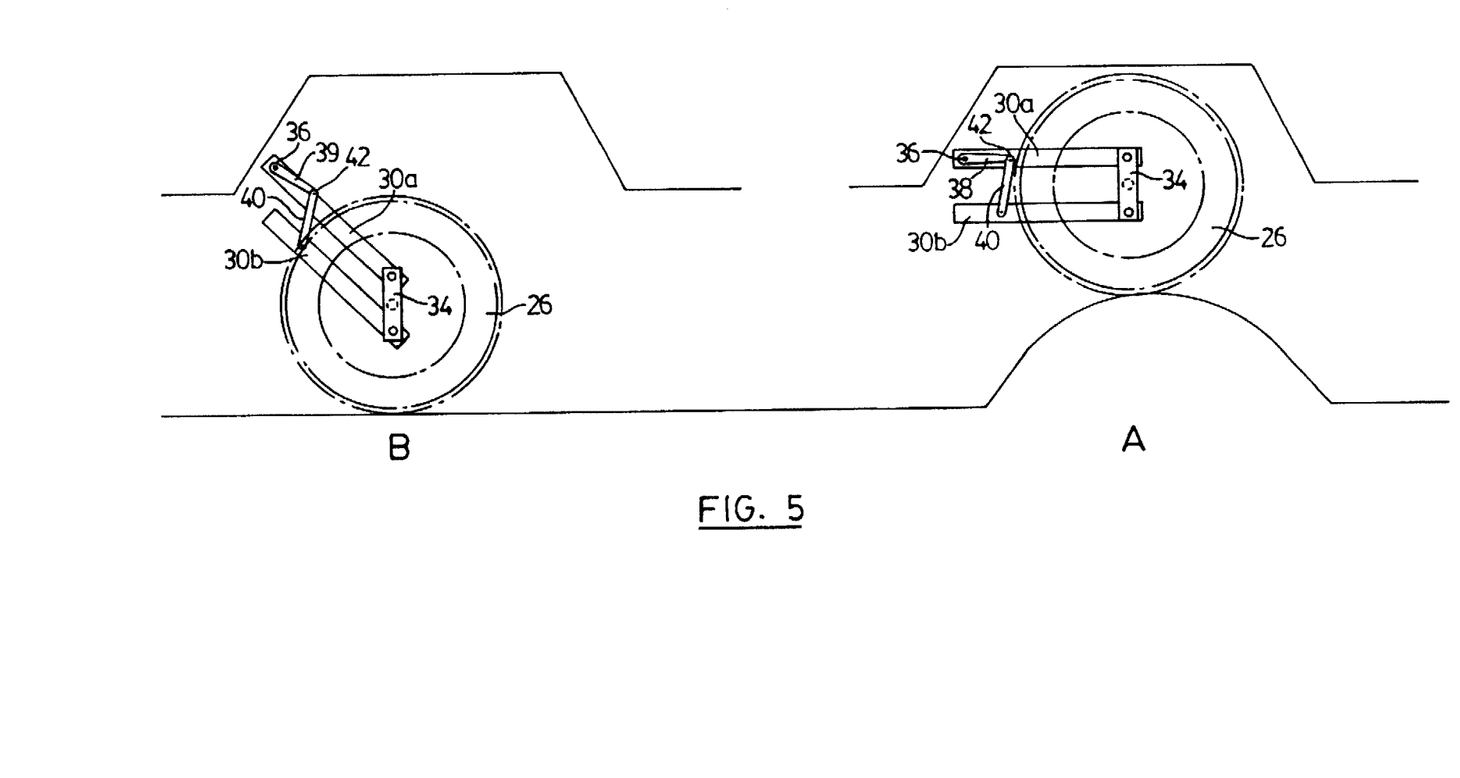
FIG. 5 schematically illustrates the installation of a Differential Torsion Spring according to the invention in an alternative independent wheel suspension system.

FIG. 5 schematically illustrates the use of the Differential Torsion Spring of the invention in a typical independent wheel suspension for a trailer. Wheel 26 is shown at position "A" with the suspension in full jounce as the wheel 26 follows a hump 28a on the road 28. On the left at position "B", the suspension is in full rebound. The action of the Differential Torsion Spring is entirely analogous to that in the double wishbone application, the only difference in geometry being that in this case control arms 30a and 30b are upper and lower trailing links which extend longitudinally of the chassis 32 rather than transversely.

Upper and lower trailing arms 30a and 30b are pivotally connected at their front ends to the chassis (i.e. the sprung mass assembly) and at their trailing ends are pivotally connected to a wheel knuckle 34. Torsion bar 36 of the Differential Torsion Spring is integrated into either of the upper or lower trailing link pivotal axes, here that of upper trailing link 30a, with one of its ends flanged to its associated trailing link, so that trailing link 30a and the end of torsion bar 36 fixed thereto rotate as a unit, the opposite end of torsion bar 36 running in bushings or bearings so that it is free to move independently of the rotation of trailing link 30a. At the free end of torsion bar 36 it is torsionally engaged by lever 38 extending perpendicularly from the pivotal axis of rotation of trailing link 30a. Tie-rod 40 links a pivotal attachment point 42 on the outboard extremity of lever 40 to a pivotal attachment point 44 on the other trailing link 30b.

The embodiment of Differential Torsion Spring shown installed in the double trailing-arm suspension of FIG. 5 is essentially the embodiment of DTS illustrated in and discussed above in connection with FIG. 2. One could also use the elementary embodiment of FIG. 1 by torsionally securing both ends of the torsion bar to respective ends of the associated trailing link, so that the trailing link and torsion bar fixed thereto rotate as a unit. In this arrangement, the lever would torsionally engage the bar at its centre position.

The particular advantage of the double trailing-arm geometry is that it permits a low floor (there being no axle underneath it). The Differential Torsion Spring is "packaged" within the trailing arm assembly, requiring no additional spring mounting points on the trailer chassis.

A further contemplated application of this particular geometric arrangement is in a belt or chain tensioner. This can be visualized by replacing road surface 28 in FIG. 5 with a belt or chain. Conveyor belts, drive belts and chains often require tensioning and backlash absorbing devices, to which a Differential Torsion Spring could provide a simple, high energy and compact solution to the problem of finding physical space for such devices.

Returning to the design features of the Differential Torsion Spring in the double trailing-arm suspension of FIG. 5, the static setting of the suspension system which determines the static ride height of the vehicle is coarsely adjusted by setting the attachment points of tie-rod 40 and the angular position of lever 38, at zero load, relative to trailing link 30a and finely adjusted by extension or contraction of adjustable tie-rod 40.

Trip-spring for Mounting Ground-contacting Implements

U.S. Pat. No. 3,815,685 (Seifert, Jr.) is directed to a "trip spring" mounting structure for the support arm of a cultivating shovel (i.e. plough), whereby the support will yieldingly resist but be capable of being swung rearwardly and upwardly at its lower end so as to clear a ground obstruction. An embodiment of applicant's Differential Torsion Spring is particularly suited to this application, which requires high spring rates and large deflections.

Because incidental obstructions in the way of a plough blade may be large (i.e. rocks) a trip spring mechanism must accommodate a larger range of angular deflection than most vehicle springs. If a single-acting torsion bar is used on a cultivator, as in the Seifert patent, it must therefore be long enough to twist through a large angular deflection without permanent deformation, while still sustaining an acceptably high spring rate. In fact, Seifert does illustrate a long and heavy bar, which would be unsuitable for use with an implement frame requiring many cultivating tools fairly closely spaced together. Moreover, long heavy torsion bars increase costs of manufacture and replacement as well as fuel, operating and maintenance costs.

Figure 6:
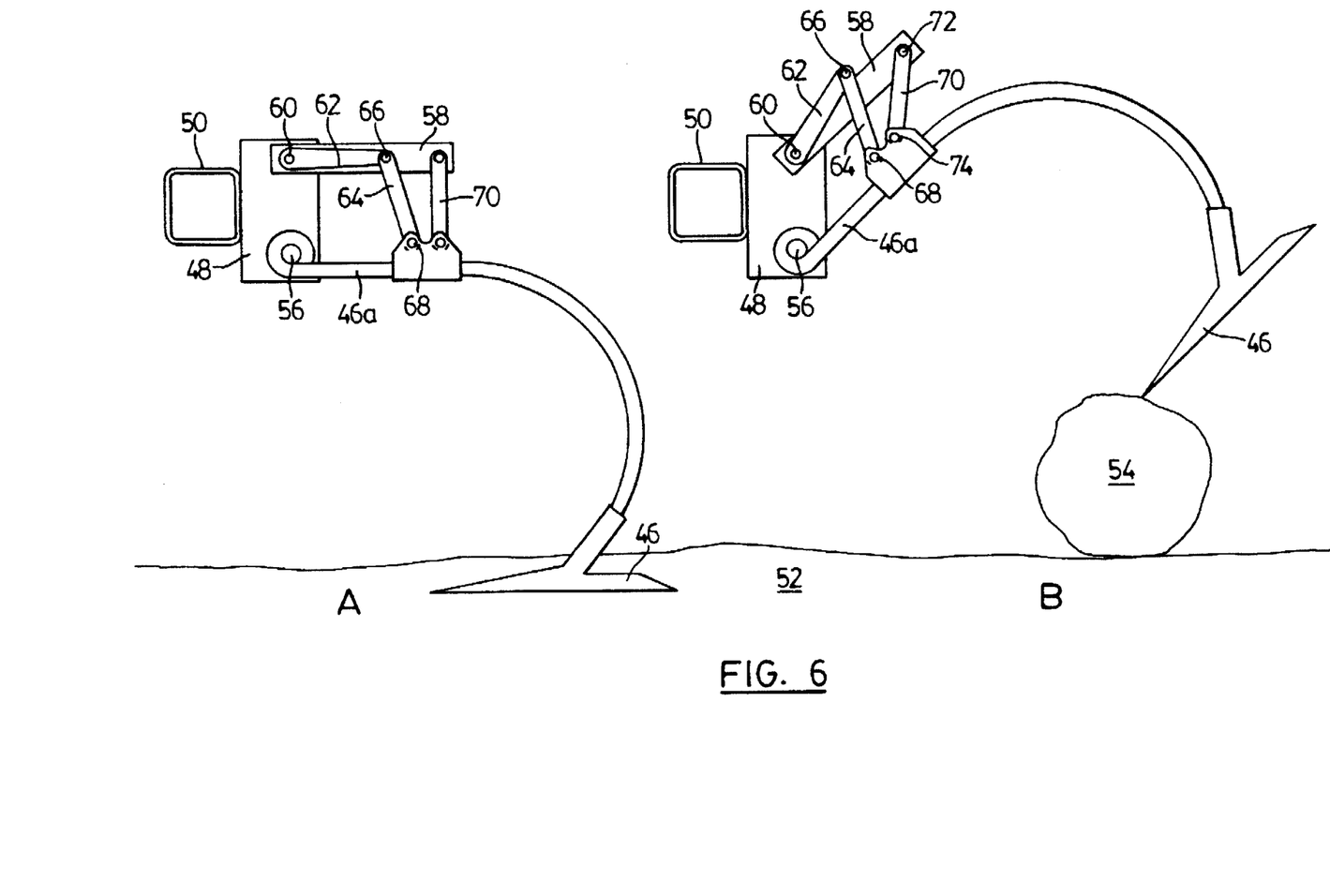
FIG. 6 illustrates the use of a Differential Torsion Spring according to the invention as a trip-spring in a mounting structure for the support arm of a plough blade.

Illustrated in FIG. 6 is a cultivator in which a Differential Torsion Spring according to the present invention acts as a "trip-spring" to resiliently link the shank 46a of plough blade 46 to a transverse bar 48 fixed to the chassis 50 of a vehicle which draws the plough along the ground 52, from right to left in the drawing figure. A plurality of these assemblies may be mounted on a single transverse bar.

At "A" the plough is in its normal operating (ploughing) position, while at "B" plough blade 46 has hit and is being deflected upwardly by rock 54. The "trip-spring" action of the Differential Torsion Spring permits the blade to swing up until it clears the obstacle and then its rebound torque forces the blade back into its normal position.

The geometric linkage is in principle the same as the "trailing arm" arrangement of the previous example, except that the lower trailing link pivotally connected to the sprung mass at 56 is actually a linear extension of the shank of the plough blade. Upper trailing link 58 torsionally engages one end of torsion bar 60 of the Differential Torsion Spring. Again, this may be effected by providing torsion bar 60 with a flanged end fixed to trailing link 58 for co-rotation therewith about its pivot axis and the opposite end of torsion bar 60 running in bushings or bearings so that it is free to move independently of the rotation of trailing link 58.

Near its free end, torsion bar 60 is torsionally engaged with lever 62 and is thence coupled to lower control link 46a by means of a tie-rod 64 linking a pivoting attachment point 66 to a pivoting attachment 68 of the lower trailing link 46a (i.e. the plough shank). The plough shank is of course directly connected to the "unsprung mass" of the plough blade 46. The linkage is completed by effectively coupling the rearmost end of upper trailing link 58 to the unsprung mass by bar link 70 linked to upper trailing link 58 and lower trailing link 46a at pivot attachments 72 and 74, respectively.

One could adapt the elementary embodiment of DTS of FIG. 1 for this application as well. In this arrangement, trailing link 58 would be bifurcated and the torsion bar 60 would be provided with flanged ends for fixing to both legs of the bifurcated trailing link 58. The lever torsionally engaging the torsion bar would be secured at a point equidistant from the two points of attachment of the torsion bar to its associated trailing link.

Figure 7:
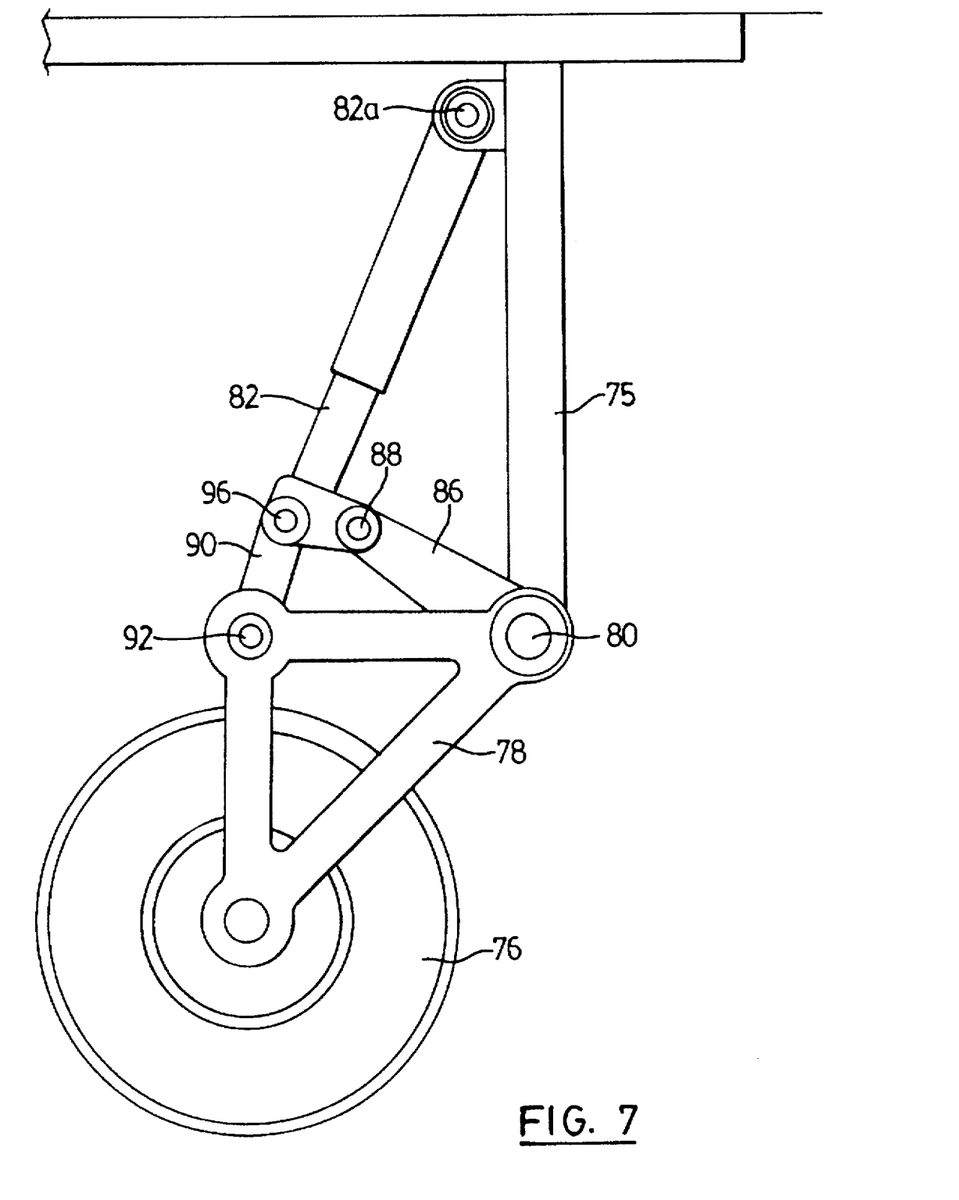
FIG. 7 is a schematic illustration of a further alternative independent wheel suspension system incorporating a Differential Torsion Spring according to the invention.

The Differential Torsion Spring arrangement depicted in FIG. 7 allows for a rising or falling spring rate, as desired, whereas a single-acting torsion bar (connected as shown in the Seifert patent) would exhibit a fairly linear rate. Selective arrangements of the Differential Torsion Spring geometry to give a falling rate for the cultivator application would be advantageous in that the larger the obstruction encountered by the plough blade, and hence the greater the angular deflection, the progressively easier it becomes to deflect the shank/trip-spring system, thereby relieving the stress on the blade, shank and the mounting structure. Once the blade has cleared the obstruction, the return torque of the Differential Torsion Spring becomes progressively higher, reaching a maximum at the point where the blade comes into contact with the soil surface. Further, the relatively short length of the torsion bar of the Differential Torsion Spring produces an assembly of much smaller transverse dimensions, thereby permitting the inclusion of a larger number of cultivator arms per unit transverse length of the implement frame.

Swing-Arm Suspension

FIG. 7 schematically illustrates a suspended wheel assembly applying the Differential Torsion Spring principle to a single swinging control arm, rather than a double wishbone or trailing arm geometry. The wheel assembly shown in FIG. 7 is particularly suitable for installation on the undercarriage strut 75 of an aircraft where it offers the advantages of a light, simple and compact suspension spring that can accommodate large angular deflections at high wheel rates.

Wheel 76 is rotationally mounted on a swing-arm 78 pivotally connected to the aircraft fuselage at an undercarriage strut 75. Swing-arm 78 serves as the first control member of this suspension linkage. Concentric with the pivot axis of swing arm 78 is a torsion bar 80 which is anchored to swing arm 78 at one end and is free to rotate at the other end within the pivot bushing of the swing-arm. The second control member of this suspension linkage is a telescoping lever 82, a conventional telescopic hydraulic damper, fixed at one end to the sprung mass of the vehicle or the aircraft's undercarriage strut 75. At its inboard end 82a, lever 82 is pivotally fixed to the sprung mass of the vehicle, i.e. to the chassis (not shown). A torsion bar lever 86 is torsionally engaged at its inboard end to the free end of torsion bar 80 and at its outboard end is connected by pivotal attachment 88 to the outboard end of telescopic lever 82. To complete the linkage, a tie-rod 90 pivotally connects the swing-arm 78, at pivotal attachment 92, to lever 82, at pivotal attachment 96.

In operation, when wheel 76 is deflected upwards, swing-arm 78 (the first control member) rotates about its pivot axis and turns the end of torsion bar 80 to which it is anchored. Simultaneously, the upward thrust of tie-rod 90 forces telescopic lever 82 (the second control member) to compress, thereby changing its angular position and forcing torsion-bar lever 86 to rotate and impose a torque near the free end of torsion bar 80. Again, torsion bar 80 experiences a net twisting which arises from the differential angular motions of the first control member (swing-arm 78) and the second control member (telescopic lever 82). As in the other applications, the Differential Torsion Spring has no direct connection to the unsprung mass but is activated by the differential motion of control arms of the linkage.

It is possible by suitable design expedients to give this system a linear, rising or a falling spring rate to suit the application. A major benefit of this particular configuration is that substantially greater deflections in conjunction with higher spring rates may be achieved than with direct acting coil or leaf-spring systems. The swing-arm suspension system incorporating a Differential Tension Spring is also very compact for the high spring energy levels that can be accommodated.

Manufacturers of mass produced vehicles are concerned with reducing cost, weight, parts count and in improving performance. A double wishbone or trailing link suspension linkage incorporating a Differential Torsion Spring meets these objectives, while precisely locating the road wheels at the front or rear of a vehicle, suspending the vehicle, and providing sufficient space and clearance for drive shafts and steering mechanism.

Vehicle suspension systems incorporating the Differential Torsion Spring as described above are capable of accommodating large deflections at the road wheel while maintaining a higher spring rate than is possible with an equivalent mass of leaf or coil springs. Designers of specialized vehicles, such as military and off-road vehicles requiring unusually large suspension deflections will find that a Differential Torsion Spring provides a solution which uses the simplest and lightest possible springing mechanism.

In cases where the vehicle design calls for changes of ride-height, wheel rate and spring rate, the Differential Torsion Spring provides easier adjustability than convention sprung linkages.

It will be appreciated that a unique springing system has been disclosed which can be adapted to a wide range of suspension systems. Modifications within the scope of the appended claims will be apparent to those of skill in the art.

I claim:

1. In a suspension system incorporating a mechanical linkage between a sprung mass assembly and an unsprung mass assembly having a first control member pivotally connected to the sprung mass assembly for swinging movement about a pivot axis and a second control member mounted for angular motion in response to relative displacements of said sprung and unsprung mass assemblies, improved springing means comprising:

(i) a two-ended torsion bar coaxial with the pivot axis of said first control member, said torsion bar being torsionally secured near at least one end thereof to said first control member for co-rotation of said at least one end of the torsion bar with said first control member about said pivot axis;

(ii) a lever torsionally secured at a first end to said torsion bar, at a selected position intermediate the ends of the torsion bar, said lever extending radially outwardly from said intermediate position to a second end of the lever at a position remote from said torsion bar; and (iii) means for pivotally linking said lever directly to said second control member, such that a differential resultant of the angular motions of said first and second control members produces in said torsion bar, between its points of torsional securement to said first control arm and to said lever, a reactive torsional spring resistance to relative displacements of said sprung and unsprung mass assemblies.

2. A springing means as defined in claim 1, wherein said torsion bar is torsionally secured at both ends thereof to said first control member for co-rotation of both ends of the torsion bar about said pivot axis, and said selected position of securement of said lever to the torsion bar is equidistant between the locations of securement of the torsion bar to the first control member.

3. A springing means as defined in claim 1, wherein said torsion bar is torsionally secured near one end thereof to said first control member for co-rotation of said one end of the bar with said first control member about said pivot axis, the other end of said torsion bar being free of torsional engagement with the first control member, and said inner end of the lever is torsionally secured to the torsion bar at a position near said free other end of the bar.

4. A springing means as defined in claim 3, wherein said means for pivotally linking the lever to the second control member comprises a tie-rod pivotally connected at said second control arm and to said lever, such that there is a reactive torsional spring resistance to relative displacements of said sprung and unsprung mass assemblies.

5. Springing means for a vehicle suspension system of the kind incorporating a linkage between a sprung mass assembly including the vehicle chassis and an unsprung mass assembly including the ground-contacting elements of the vehicle and having a first control member pivotally connected to the chassis for swinging movement about a pivot axis and a second control member mounted for angular motion, in response to relative displacements of said sprung and unsprung mass assemblies, comprising:

(i) a two-ended torsion bar coaxial with the pivot axis of said first control member, said torsion bar being torsionally secured near one end thereof to said first control member for co-rotation of said one end of the bar with said first control member about said pivot axis, the other end of said torsion bar being free of torsional engagement with said first control member;

(ii) a lever torsionally secured at a first end to said torsion bar at a position near said free other end of the torsion bar and extending radially outwardly from said position on the torsion bar to a second end of the lever; and (iii) a tie-rod pivotally connected at a first end thereof to a selected attachment position on said lever and pivotally connected at a second end thereof to a selected attachment position on said second control member, such that a differential resultant of the angular motions of said first and second control members produces in said torsion bar, between its points of torsional securement to said first control arm and to said lever, a reactive torsional spring resistance to relative displacements of said sprung and unsprung mass assemblies.

6. Springing means according to claim 5, wherein said vehicle suspension system is a double wishbone type suspension for an automotive vehicle wheel rotatably supported by a hub carrier and said first and second control members are respectively the upper and lower bifurcated control arms pivotally connecting upper and lower ends of the knuckle to the vehicle chassis.

7. Springing means according to claim 6, wherein said free other end of the torsion bar is in the form of a narrowed spindle and one end of said upper control arm is provided with a cylindrical channel adapted to receive said spindle and having a low-friction inner bearing surface.

8. Springing means according to claim 7, wherein said one end of the torsion bar includes an integral flange adapted to be fixed to the other end of said upper control arm for rotation of said one end of the bar coaxially with the pivot axis of the upper control arm.

9. Springing means according to claim 6, wherein said tie-rod is adapted to be adjusted in length prior to its installation in the springing means and pivotal attachment of its first and second ends to the lever and to the lower control member respectively.

10. Springing means according to claim 6, wherein said torsion bar is cross-sectionally shaped at said position near said other free end thereof, so as to lockingly engage with a profile in said first end of said lever.

11. Springing means according to claim 10, wherein said lever is provided with a linear sequence of alternative locations for pivotal connection to said first end of the tie-rod.

12. Springing means according to claim 5, wherein said vehicle suspension system is of the type in which said first and second control members are respectively upper and lower trailing arms pivotally connected at one end to respective upper and lower points of pivotal attachment on the hub of a vehicle wheel and extending longitudinally of the chassis to respective upper and lower points of pivotal attachment to the chassis.

13. Springing means according to claim 5, wherein said ground-contacting element is the blade of a plough, said first and second control members are respectively upper and lower trailing arms extending longitudinally of the chassis and pivotally attached thereto at respective upper and lower pivotal connections, said lower trailing arm being integral with the shank of said plough blade, and wherein the rear end of said upper and lower trailing arms are pivotally joined by a lateral link.

14. Springing means according to claim 5, wherein said ground-contacting element is a wheel, said first control member is a spring-arm pivotally connected at one end thereof to the chassis and at the other end thereof to the axle of the wheel, said second control member is a telescoping lever mounted pivotally at one end thereof to the chassis for angular movement and pivotally connected at the other end thereof to said swing-arm by a lateral link.

\* \* \* \* \*